(12) United States Patent
Lethin et al.

(10) Patent No.: US 8,914,601 B1
(45) Date of Patent: Dec. 16, 2014

(54) SYSTEMS AND METHODS FOR A FAST INTERCONNECT TABLE

(75) Inventors: Richard A. Lethin, New York, NY (US); Jordi Ros-Giralt, Newport Beach, CA (US); Peter Szilagyi, Medina, NY (US)

(73) Assignee: Reservoir Labs, Inc., New York, NY (US)

( * ) Notice: Subject to any disclaimer, the term of this patent is extended or adjusted under 35 U.S.C. 154(b) by 661 days.

(21) Appl. No.: 13/275,688

(22) Filed: Oct. 18, 2011

Related U.S. Application Data

(60) Provisional application No. 61/394,140, filed on Oct. 18, 2010.

(51) Int. Cl.
*G06F 12/00* (2006.01)

(52) U.S. Cl.
USPC .................. 711/168; 711/150; 711/E12.069; 711/216; 711/221

(58) Field of Classification Search
USPC .......................................................... 711/168
See application file for complete search history.

(56) References Cited

U.S. PATENT DOCUMENTS

| | | |
|---|---|---|
| 5,442,699 A | 8/1995 | Arnold et al. |
| 5,442,797 A | 8/1995 | Casavant et al. |
| 5,613,136 A | 3/1997 | Casavant et al. |
| 5,742,814 A | 4/1998 | Balasa et al. |
| 5,920,854 A | 7/1999 | Kirsch et al. |
| 5,953,531 A | 9/1999 | Megiddo et al. |
| 6,006,033 A | 12/1999 | Heisch |
| 6,018,735 A | 1/2000 | Hunter |
| 6,038,398 A | 3/2000 | Schooler |
| 6,131,092 A | 10/2000 | Masand |
| 6,279,113 B1 | 8/2001 | Vaidya |
| 6,327,699 B1 | 12/2001 | Larus et al. |
| 6,338,057 B1 | 1/2002 | Weeks |
| 6,651,246 B1 | 11/2003 | Archambault et al. |
| 6,754,650 B2 | 6/2004 | Cho et al. |
| 6,772,415 B1 | 8/2004 | Danckaert et al. |
| 6,785,677 B1 | 8/2004 | Fritchman |
| 6,792,546 B1 | 9/2004 | Shanklin et al. |
| 6,880,087 B1 | 4/2005 | Carter |
| 6,912,526 B2 | 6/2005 | Akaboshi |

(Continued)

OTHER PUBLICATIONS

Ahmed et al, Synthesizing Transformations for Locality Enhancement of Imperfectly-nested Loops Nests, ACM ICS 2000, pp. 141-152.

(Continued)

*Primary Examiner* — Reginald Bragdon
*Assistant Examiner* — Hamdy S Ahmed
(74) *Attorney, Agent, or Firm* — Goodwin Proctor LLP

(57) ABSTRACT

In a multi-processor (e.g., multi-core) computer system, several processors can simultaneously access data without corruption thereof by: designating to each processor a portion of a hash table containing the data; by allowing each processor to access only those data elements belonging to the portion of the hash table designated to that processor; and by sending, via a network, other data elements to the processors that are designated the portions of the hash table to which the other data elements belong. The network avoids memory contention at each processor without requiring a memory-based lock. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

32 Claims, 5 Drawing Sheets

(56) References Cited

U.S. PATENT DOCUMENTS

| | | | |
|---|---|---|---|
| 6,952,694 B2 | 10/2005 | Mathur et al. |
| 6,952,821 B2 | 10/2005 | Schreiber |
| 7,086,038 B2 | 8/2006 | Cronquist et al. |
| 7,185,327 B2 | 2/2007 | Scales |
| 7,225,188 B1 | 5/2007 | Gai et al. |
| 7,260,558 B1 | 8/2007 | Cheng et al. |
| 7,594,260 B2 | 9/2009 | Porras et al. |
| 7,634,566 B2 | 12/2009 | Turner et al. |
| 7,757,222 B2 | 7/2010 | Liao et al. |
| 8,087,010 B2 | 12/2011 | Eichenberger et al. |
| 8,108,845 B2 | 1/2012 | Little et al. |
| 8,230,408 B2 | 7/2012 | Eng |
| 8,250,550 B2 | 8/2012 | Luszczek et al. |
| 8,255,890 B2 | 8/2012 | Luszczek et al. |
| 8,307,347 B2 | 11/2012 | Austin et al. |
| 2002/0021838 A1 | 2/2002 | Richardson et al. |
| 2003/0097652 A1 | 5/2003 | Roediger et al. |
| 2004/0034754 A1 | 2/2004 | Schreiber |
| 2004/0068501 A1 | 4/2004 | McGoveran |
| 2005/0114700 A1 | 5/2005 | Barrie et al. |
| 2006/0048121 A1 | 3/2006 | Blainey et al. |
| 2006/0048123 A1 | 3/2006 | Martin |
| 2006/0085858 A1 | 4/2006 | Noel et al. |
| 2007/0033367 A1 | 2/2007 | Sakarda et al. |
| 2007/0074195 A1 | 3/2007 | Liao et al. |
| 2007/0192861 A1 | 8/2007 | Varghese et al. |
| 2008/0010680 A1 | 1/2008 | Cao et al. |
| 2009/0037889 A1 | 2/2009 | Li et al. |
| 2009/0083724 A1 | 3/2009 | Eichenberger et al. |
| 2009/0119677 A1 | 5/2009 | Stefansson et al. |
| 2009/0259997 A1 | 10/2009 | Grover et al. |
| 2009/0307673 A1 | 12/2009 | Eichenberger et al. |
| 2010/0050164 A1 | 2/2010 | Van De Waerdt et al. |
| 2010/0162225 A1 | 6/2010 | Huang et al. |

OTHER PUBLICATIONS

Ahmed et al, Tiling Imperfectly-nested Loop Nests, IEEE 2000,14 pgs.
Aho et al, Compilers: Principles, Techniques, & Tools, 2nd Edition, 2006, pp. 173-186.
Aho et al, Efficient String Matching: An Aid to Bibliographic Search, Communications of the ACM, vol. 18, No. 6, Jun. 1975, pp. 333-340.
Aigner et al, an Overview of the SUIF2 Compiler Infrastructure, Computer Systems Laboratory, Standford University, 1999, pp. 1-14.
Aldwairi et al, Configurable String Matching Hardware for Speeding Up Intrusion Detection, ACM SIGARCH Computer Architecture News, Vo. 33, No. 1, Mar. 2005, pp. 99-107.
Allen et al, Conversion of Control Dependence to Data Dependence, ACM 1983, pp. 177-189.
Ancourt et al, Scanning Polyhedra with DO Loops, Proceedings of the third ACM SIGPLAN symposium on Principles and practice of parallel programming, Apr. 21-24, 12 pgs. 1991.
Appel, A.W., Deobfuscation is in NP, Princeton University, Aug. 21, 2002, 2 pgs.
Ayers et al, Aggressive Inlining, PLDI '92 Las Vegas, NV, USA.
Ball et al, Branch Prediction for Free, Technical Report #1137, University of Wisconsin, 1993, 29 pgs.
Barak et al, On the (Im)possibility of Obfuscating Programs, Advances in Cryptology, CRYPTO 2001, vol. 2139, pp. 1-18.
Barthou et al, Maximal Static Expansion, International Journal of Parallel Programming, vol. 28, No. 3, 2000, 20 pgs.
Bastoul et al, Putting Polyhedral Loop Transformations to Work, INRIA, No. 4902, Jul. 2003.
Bastoul, C., Generating Loops for Scanning Polyhedra: CLooG User's Guide, First Version, Rev. 1.6, Apr. 8, 2004, pp. 1-30.
Bastoul, Code Generation in the Polyhedral Model Is Easier Than You Think, Proceedings of the 13th International Conference on Parallel Architecture and Compilation Techniques, 2004.
Bastoul, Efficient Code Generation for Automatic Parallelization and Optimization, Proceedings of the Second International Symposium on Parallel and Distributed Computing, 2003.
Bednara et al, Synthesis for FPGA Implementations From Loop Algorithms, In Proceedings ofthe Int. Conf. on Engineering of Reconfigurable Systems and Algorithms (ERSA), Jun. 2001.
Berkelaar et al, The IpSolve Package, Sep. 21, 2007, pp. 1-9.
Bik et al, Implementation of Fourier-Motzkin Elimination, Technical Report 94-42, Department. of Computer Science, Leiden University, 1994.
Bondhugula et al, A Practical and Fully Automatic Polyhedral Program Optimization System,OSU OSU-CISRC-10/07-TR70; Dec. 14, 2007.
Bondhugula et al, A Practical Automatic Polyhedral Parallelizer and Locality Optimizer, PDLI '08, Jun. 7-13, 2008.
Bondhugula et al, Affine Transformations for Communication Minimal Parallelization and Locality Optimization of Arbitrarily Nested Loop Sequences, OSU CSE Technical Report, OSU-CISRC-5/07/TR43, pp. 1-30.
Bondhugula et al, Automatic Mapping of Nested Loops to FPGAs, OSU, Mar. 19, 2007.
Bondhugula et al, Toward Effective Automatic Parallelization for Multi\par core Systems, In proceeding of 22nd IEEE International Symposium on Parallell and Distributed Processing, (IPDPS 2008). Miami, Florida USA, Apr. 14, 2008.
Boulet et al, (Pen)-ultimate tiling?, Laboratoire de l'Informatique du Parallelisme, Research Report No. 93-96, Nov. 1993, pp. 1-17.
Boulet et al, Scanning polyhedra without Do-loops, Parallel Architectures and Compilation Techniques, 1998, Proceedings 1998 International Conference on Oct. 12-18, 1998, pp. 4-11.
Briggs et al, Effective Partial Redundancy Elimination, Sigplan PLDI, Jun. 1994, pp. 1-12.
Brumley et al, Towards Automatic Generation of Vulnerability-Based Signatures, Proceedings of the 2006 IEEE Symposium on Security and Privacy, pp. 1-15.
Burger et al, Scaling to the End of the Silicon with EDGE Architectures, Computer, Jul. 2004, pp. 44-55.
Burke et al, Flow-Insensitive Interprocedural Alias Analysis in the Presence of Pointers, Lecture Notes in Computer Science, Proceedings from the 7th International Workshop on Languages and Compilers for Parallel Computing, vol. 892, 1995, 18 pgs.
Cifuentes, C., A Structuring Algorithm for Decompilation, XIX Conferencia Latinoamericana de Inforamatica, Buenos Aires, Argentina, Aug. 2-6, 1993, pp. 267-276.
Cifuentes,Structuring Decompiled Graphs, Department of Computer Science, University of Tasmania, 1994, 15 pgs.
Clauss et al, Automatic Memory Layout Transformations to Optimize Spatial Locality in Parameterized Loop Nests, ACM SIGARCH Computer Architecture News, vol. 28, No. 1, 2000, pp. 1-9.
Clauss et al, Deriving Formulae to Count Solutions to Parameterized Linear Systems using Ehrhart Polynomials: Applications to the Analysis of Nested-Loop Programs, Apr. 10, 1997.
ClearSpeed—Accelerator Technology Primer, ClearSpeed Technology Primer, ClearSpeed Technology, Inc., 2006.
ClearSpeed—ClearSpeed Programming Model: An introduction, ClearSpeed Technology Inc. 2007.
ClearSpeed—ClearSpeed Programming Model: Card-side Libraries, ClearSpeed Technology Inc. 2007.
ClearSpeed—ClearSpeed Programming Model: Optimizing Performance, ClearSpeed Technology Inc. 2007.
ClearSpeed—CSX Processor Architecture Whitepaper, ClearSpeed Technology Plc., 2006.
ClearSpeed—Introduction to ClearSpeed Acceleration, ClearSpeed Technology Inc., 2007, 27 pages.
ClearSpeed—Introduction to ClearSpeed Acceleration, Powerpoint presentation, ClearSpeed Technology Plc, 2007, 133 pgs.
ClearSpeed—Overview of Architecture: System Level (host) Architecture and ClearSpeed Architecture, ClearSpeed Technology Inc., 2007.
ClearSpeed Introductory Programming Manual—The ClearSpeed Software Development Kit, ClearSpeed Technology Inc. 2007.
ClearSpeed Programming Model: Case Study, ClearSpeed Technology Inc., 2007.
Clearspeed Technical Training: Software Development, ClearSpeed Technology Inc., 2007.

(56) References Cited

OTHER PUBLICATIONS

Click et al, A Simple Graph-Based Intermediate Representation, ACM IR'95, 1995, pp. 35-49.
Click, C., Global Code Motion Global Value Numbering, ACM SIGPLAN' 95, pp. 246-257, 1995.
Collard et al, Automatic Generation of Data Parallel Code, Proceedings of the Fourth International Workshop on Compilers for Parallel Computers, Dec. 1993.
Collard et al, Fuzzy Array Dataflow Analysis, ACM Principles and Practice of Parallel Programming, PPOpp'95, Jul. 1995, 10 pgs.
Collberg et al, A Taxonomy of Obfuscating Transformations, Technical Report 148, Department of Computer Science, University of Auckland, Jul. 1997. http://www.cs.auckland.ac.nz/-Ccollberg/Research/Publications/CollbergThomborsonLow97a.
Collberg et al, Manufacturing Cheap, Resilient, and Stealthy Opaque Constructs, POPL 98, San Diego, CA 1998.
Cooper et al, Operator Strength Reduction, ACM Transactions on Programming Languages and Systems, vol. 23, No. 5, pp. 603-625, Sep. 2001.
Cooper et al, SCC-Based Value Numbering, CRPC-TR95636-S, Oct. 1995, pp. 1-12.
Cousot et al, Abstract Interpretation: A Unified Lattice Model for Static Analysis of Programs by Construction or Approximation of Fixpoints, Conference Record of the Fourth ACM Symposium on Principles of Programming Languages, Jan. 17-19, 1977, 16 pgs.
Cytron et al, Efficiently Computing Static Single Assignment Form and The Control Dependence Graph, Mar. 7, 1991, pp. 1-52.
Darte et al, Algorithm, Chapter 5: Parallelism Detection in Nested Loops, pp. 193-226.
Darte et al, Automatic parallelization based on multi-dimensional scheduling, Research Report No. 94-24, Laboratoire de l'Informatique de Parallelisme, 1994, pp. 1-34.
Darte et al, Lattice-Based Memory Allocation, ACM CASES'03, pp. 298-308, 2003.
Darte et al, Lattice-Based Memory Allocation, IEEE Transactions on Computers, vol. 54, No. 10, Oct. 2005, pp. 1242-1257.
Darte et al, Lattice-Based Memory Allocation, Research Report No. 2004-23, Apr. 2004, 1-43.
Darte et al, Revisiting the decomposition of Karp, Miller and Winograd, Parallel Processing Letters, 1995.
Ezick et al, Alef: A SAT Solver for MPI-Connected Clusters, Technical Report, Aug. 13, 2008, 21 pgs.
Featurier, Some efficient solutions to the affine scheduling problem Part I One-dimensional Time, Laboratoire MASI, Institute Blaise Pascal, Universite de Versailles St-Quentin, Apr. 23, 1993.
Feautrier et al, Solving Systems of Affine (In)Equalities: PIP's User's Guide, 4th Version, rev. 1.4, Oct. 18, 2003, pp. 1-25.
Feautrier, P., Array Expansion, Universite de Versailles St-Quentin, Jul. 1988, pp. 1-20.
Feautrier, P., Dataflow Analysis of Array and Scalar References, Int. J. of Parallel Programming, vol. 20, No. 1, 1991, pp. 1-37.
Feautrier, P., Parametric Integer Programming, RAIRO Operationnelle, vol. 22, Sep. 1988, pp. 1-25.
Feautrier, P., Some efficient solutions to the affine scheduling problem, Part II, Multidimensional Time, IBP/MASI, No. 92.78, 1992, pp. 1-28.
Ferrante et al, The Program Dependence Graph and Its Use in Optimization, ACM Transactions on Programming Languages and Systems, vol. 9, No. 3, Jul. 1987, pp. 319-349.
Franke et al, Compiler Transformation of Pointers to Explicit Array Accesses in DSP Applications, Institute for Computing Systems Architecture (ICSA), University of Edinburgh.
Gautam et al, The Z-Polyhedral Model, SIGPLAN Symp. on Principles and Practice of Parallel Programming, pp. 237-248, New York, NY, USA, 2007.
George et al, Iterated Register Coalescing, ACM Transactions on Programming Languages and Systems, vol. 18, No. 3, May 1996, pp. 300-324.
Ghosh et al, Cache Miss Equations: A Compiler Framework for Analyzing and Tuning Memory Behavior, ACM Transactions on Programming Languages and Systems, vol. 21, No. 4, Jul. 1999, pp. 702-745.
Griebl et al, Code Generation in the Polytope Model, pact, pp. 106, Seventh International Conference on Parallel Architectures and Compilation Techniques (PACT'98), 1998.
Griebl et al, Forward Communication Only Placements and their Use for Parallel Program Construction, University of Passau.
Griebl et al, Space-Time Mapping and Tiling: A Helpful Combination, Concurrency and Comput.: Pract. Exper. 2004, 16:221-246.
Griebl, Automatic Parallelization of Loop Programs for Distributed Memory Architectures, Fakultat fur Mathematik und Informatik, Jun. 2, 2004.
Griebl, On the Mechanical Tiling of Space-Time Mapped Loop Nests, Fakultat fur Mthemetik und Informatik, Universitat Passau, Germany.
Gu et al, Symbolic Array Dataflow Analysis for Array Privatization and Program Parallelization, Proceedings of Supercomputing '95, pp. 1-19, 1995.
Gustafson et al, ClearSpeed—Whitepaper: Accelerating the Intel® Math Kernel Library, ClearSpeed Technology Inc., 2006.
Heintze et al, Ultra-fast Aliasing Analysis Using CLA: A Million Lines of C Code in a Second, ACM SIGPLAN Notices, vol. 36, No. 5, 2001, 10 pgs.
Intel® QuickAssist Technology Accelerator Abstraction Layer (AAL), White Paper, Intel® Corporation, 2007, 8 pgs.
International Preliminary Report on Patentability dated Mar. 31, 2011 for PCT Application No. PCT/US2009/057194.
International Preliminary Report on Patentability dated Oct. 27, 2011 for PCT Application No. PCT/US2010/031524.
International Search Report and the Written Opinion dated Jan. 17, 2008 for PCT Application No. PCT/US2007/72260.
International Search Report and the Written Opinion dated Mar. 18, 2010 for PCT Application No. PCT/US2009/057194.
International Search Report and the Written Opinion dated Nov. 26, 2010 for PCT Application No. PCT/US2010/031524.
International Search Report and the Written Opinion dated Dec. 1, 2010 for PCT Application No. PCT/US2010/033049.
Irigoin et al, Supernode Partitioning, Proceedings of the 15th Annual ACM SIGACT-SIGPLAN Symposium on Principles of Programming Languages, San Diego, CA, Jan. 1988.
JGAP Frequently Asked Questions, Sourceforge.net, pp. 1-61.
Jimenez et al, Register Tiling in Nonrectangular Iteration Spaces, ACM Transactions on Programming Languages and Systems, vol. 24, No. 4, pp. 409-453, Jul. 2002.
Kandemir et al, Optimizing Spatial Locality in Loop Nests using Linear Algebra, Proc. 7th International Workshop on Compliers for Parallel Computers, Sweden Jun. 1998.
Kelly et al, Code Generation for Multiple Mappings, frontiers, Fifth Symposium on the Frontiers of Massively Parallel Computation (Frontiers '95), 1995, pp. 1-11.
Kelly, W. A., Ph.D. Dissertation, Optimization within a Unified Transformation Framework, Dec. 8, 1996, pp. 1-89.
Kildall, G.A., A Unified Approach to Global Program Optimization, Annual Symposium on Principles of Programming Languages, Proceedings of the 1st annual ACM SIGACT-SIGPLAN symposium on Principles of programming languages, pp. 194-206, 1973.
Knoop et al, Partial Dead Code Elimination, Conference on Programming Language Design and Implementation, Proceedings of the ACM SIGPLAN 1994 conference on Programming language design and implementation, pp. 147-158, 1994.
Kodukula et al, An Experimental Evaluation of Tiling and Shacking for Memory Hierarchy Management, ACM ICS'99, 1999, pp. 482-491.
Lam, M., Software Pipeline: An Effective Scheduling Technique for VLIW Machines, Proceedings of the SIGPLAN '88 Conference on Programming Language Design and Implementation, Jun. 22-24, 1988, pp. 318-328.
Landi, W. Undecidability of Static Analysis, From ACM Letters on Programming Languages and Systems, vol. 1, No. 4, 1992, pp. 1-17.
Le Verge, H., A Note on Chernikova's Algorithm, Research Report, Jul. 27, 1994, pp. 1-25.

(56) References Cited

OTHER PUBLICATIONS

Lengauer et al, A Fast Algorithm for Finding Dominators in a Flowgraph, ACM Transaction on Programming Languages and Systems, vol. 1, No. 1, Jul. 1979, pp. 121-141.
Lethin et al, Mapping Loops for the ClearSpeed Processor Using the R-Stream Compiler, Feb. 4, 2008.
Lethin et al, R-Stream: A Parametric High Level Compiler, Reservoir Labs, Inc., 2 pgs.
Lethin et al, The R-Stream 3.0 Compiler, Dec. 18, 2007.
Lethin et al, The R-Stream 3.0 Compiler, Feb. 4, 2008.
Lethin et al, The R-Stream 3.0: Polyheadral Mapper, XPCA Review, Feb. 6, 2007.
Lethin, Software Tools to Optimize BMD Radar Algorithms to COTS Hardware—Final Report, Sep. 12, 2007.
Lim et al, Blocking and Array Contraction Across Arbitrarily Nested Loops Using Affine Partitioning, ACM PPOPP'01, 2001, pp. 1-10.
Lim et al, Maximizing Parallelism and Minimizing Synchronization with Affine Transforms, 24th Annual ACM SIGPLAN-SIGACT Symposium on Principles of Programming Languages, Paris, France, Jan. 1997.
Loechner et al, Precise Data Locality Optimization of Nested Loops, The Journal of Supercomputing, 21, pp. 37-76, 2002.
Maydan et al, Array Data-Flow Analysis and its Use in Array Privatization, ACM-20th PoPL-1, 1993, pp. 2-15.
McWhirter et al, Normalised Givens Rotations for Recursive Least Squares Processing, VLSI Signal Processing, VIII, 1995. IEEE Signal Processing Society [Workshop on], 1995, pp. 323-332.
Megiddo et al, Optimal Weighted Loop Fusion for Parallel Programs, ACM Symposium on Parallel Algorithms and Architectures archive Proceedings of the ninth annual ACM symposium on Parallel algorithms and architectures, pp. 282-291, 1997.
Meister et al, Optimizing and Mapping Tool Chain for FPGA Programming—Final Report Phase 1 SBIR Project, Sep. 28, 2007.
Meister et al, Static Software Tools to Optimize BMD Radar Algorithms to COTS Hardware, Quarterly Report #1, 2008, pp. 1-22.
Meister, B. Stating and Manipulating Periodicity in the Polytope Model. Applications to Program Analysis and Optimization, Universite Louis Pasteur Strasbourg, 2004, pp. 1-138.
Nookala et al, A Library for Z-Polyhedral Operations, Publication Interne No. 1330, IRISA, Publication No. 1330, May 2000, pp. 1-29.
Pop et al, Fast Recognition of Scalar Evolutions on Three-Address SSA Code, CRI/ENSMP Research Report, A/354/CRI, Apr. 1, 2004.
Pop et al, Induction Variable Analysis with Delayed Abstractions, ACM Transactions on Architecture and Code Optimization, vol. V, No. N, pp. 1-30, Aug. 2005.
Pugh, W. The Omega Test: a fast and practical integer programming algorithm for dependence analysis, ACM, Aug. 1992, pp. 1-19.
Quillere et al, Generation of Efficient Nested Loops from Polyhedra, 2000 Kluwer Academic Publishers, 2000.
Quillere et al, On Code-Generation in the Polyhedral Model, 10 pgs.
Quinton et al, On Manipulating Z-polyhedra, IRISA, Publication Interne No. 1016, Jul. 1996.
Quinton et al, The Mapping of Linear Recurrence Equations on Regular Arrays, Journal of VLSI Signal Processing, vol. 1, 35 pgs. (1989).
Rabinkin et al, Adaptive Array Beamforming with Fixed-Point Arithmetic Matrix Inversion using Givens Rotations, Proc. SPIE vol. 4474, 2001, pp. 294-305.
Rau, B. R., Iterative Modulo scheduling: An Algorithm for Software Pipelining Loops, ACM MICRO, 1994, pp. 63-74.
Reconfigurable Application-Specific Computing User's Guide, 2007, pp. 1-257.
Renganarayana, et al, A Geometric Programming Framework for Optimal Multi-Level Tiling, Conference on High Performance Networking and Computing, Proceedings of the 2004 ACM/IEEE conference on Supercomputing, 2004, 14 pgs.
Reservoir Labs, Inc., Optimizing and Mapping Tool Chain for FPGA Programming, Phase II Proposal, Proposal No. D2-0627, 40 pgs.
Reservoir Labs, Software Tools to Optimize BMD Radar Algorithms to COTS Hardware: Phase II Proposal, Topic No. MDA06-031, Proposal No. B2-1415.
Ros-Giralt et al, Generation of High-Performance Protocol-Aware Analyzers with Applications in Intrusion Detection Systems, Reservoir Labs, 8 pgs.
Ros-Girolt et al, Compilation and Optimization of Protocol Analyzers for High-Speed Network Intrusion Prevention, High Performance Networks / High-Speed Network Security Systems, Topic No. 41b, Reservoir Labs, Inc. 2009, pp. 1-54.
Sankaralingam et al, Distributed Microarchitectural Protocols in the TRIPS Prototype Processor, International Symposium on Microarchitecture, Proceedings of the 39th Annual IEEE/ACM International symposium on Microarchitecture, 2006, 12 pgs.
Schreiber et al, Near-Optimal Allocation of Local Memory Arrays, HP Laboratories Palo Alto, HPL-2004-24, Feb. 17, 2004.
Schwartz et al, VSIPL 1.1 API, 2002, pp. 1-739.
Seghir et al, Counting Points in Integer Affine Transformation of Parametric Z-polytopes, Research report, Universite Louis Pasteur, LSIIT (UMR CNRS 7005), Mar. 2007, pp. 1-24.
Seghir et al, Memory Optimization by Counting Points in Integer Transformation of Parametric Polytopes, ACM CASES'06, 2006, pp. 74-82.
Simpson, L. T., Thesis, Value-Driven Redundancy Elimination, Rice University, 1996, pp. 1-150.
Song et al, A Compiler Framework for Tiling Imperfectly-Nested Loops, Languages and Compilers for Parallel Computing, vol. 1863, 2000, pp. 1-17.
Springer et al, An Architecture for Software Obfuscation—Final Technical Report for Phase 1 SBIR, Jul. 30, 2007.
Springer et al, An Architecture for Software Obfuscation, PowerPoint presentation, 2007.
The Cell Roadmap, Published on PPCNUX at http://www.ppcnux.com/?q=print/6666.
The Polylib Team, Polylib User's Manual, Apr. 24, 2002, pp. 1-44.
Touati et a, Early Control of Register Pressure for Software Pipelined Loops, In Proceedings of the International Conference on Compiler Construction (CC), Warsaw, Poland, Apr. 2003. Springer-Verlag, 15 pgs.
Tu et al, Automatic Array Privatization, Lecture Notes in Computer Science, vol. 1808, 2001, 22 pgs.
Tu, P., Thesis, Automatic Array Privatization and Demand-Driven Symbolic Analysis, University of Illinois, 1995, pp. 1-144.
Udupa et al, Deobfuscation—Reverse Engineering Obfuscated Code, Proceedings of the 12th Working Conference on Reverse Engineering (WCRE'05), 10 pgs. 2005.
Vangal et al, An 80-Tile 1.28TFLOPS Network-on-Chip in 65Nm CMOS, ISSCC 2007, Session 5, Microprocessors/5.2, 3 pgs.
Vasilache et al, Alef: A SAT Solver for MPI-Connected Clusters, Reservoir Labs, 6 pgs.
Vasilache et al, Polyhedral Code Generation in the Real World, Compiler Construction, vol. 3923, 2006, 15 pgs.
Vasilache, Scalable Program Optimization Techniques in the Polyhedral Model, Thesis, Universite de Paris-SUD, UFR Scientifique d'orsay Inria Futures, Sep. 28, 2007.
Verdoolaege et al, Counting Integer Points in Parametric Polytopes using Barvinkok's Rational Functions, Algorithmica, 2007, pp. 1-33.
Wang, C., Dissertation—A Security Architecture for Survivability Mechanisms, University of Virginia, 2000, pp. 1-209.
Wegman et al, Constant Propagation with Conditional Branches, ACM Transactions on Programming Languages and Systems, vol. 13, No. 2, Apr. 1991, pp. 181-210.
Weise et al, Value Dependence Graphs: Representation Without Taxation, Annual Symposium on Principles of Programming Languages, Proceedings of the 21st ACM SIGPLAN-SIGACT symposium on Principles of programming languages, 1994, 14 pgs.
Whaley et al, An Efficient Inclusion-Based Points-To Analysis for Strictly-Typed Languages, Lecture Notes in Computer Science, vol. 2477, 2002, 16 pgs.
Wilde, D. K., A Library for Doing Polyhedral Operations, IRISA, Publication No. 785, 1993, pp. 1-48.

(56) References Cited

OTHER PUBLICATIONS

Wolf et al, A Data Locality Optimizing Algorithm, Proceedings of the ACM SIGPLAN '91 Conference on Programming Language Design and Implementation, Jun. 26-28, 1991, pp. 30-44.

Wu et al, Static Branch Frequency and Program Profile Analysis, 27th IEEE/ACM International Symposium on Microarchitecture (MICRO-27), 1994, 11 pgs.

Xue et al, Enabling Loop Fusion and Tiling for Cache Performance by Fixing Fusion-Preventing Data Dependences, Proceedings of the 2005 International Conference on Parallel Processing (ICPP'05), 2005, pp. 1-9.

Xue, On Tiling as a Loop Transformation, Department of Mathematics, Statistics and Computing Science, University of New England, Australia, 15 pgs.

Aloul et al, Solution and Optimization of Systems of Pseudo-Boolean Consraints, IEEE Transactions on Computers, vol. 56, No. 1 0, Oct. 2007, pp. 1415-1424.

Buluc et al, Parallel Sparse Matrix-Matrix Multiplication and Indexing; Implementation and Experiments, SIAM Journal of Scientific Computing(SISC), 2012.

Chang et al, Parallel sparse supports for array intrinsic functions of Fortran 90, J. Supercomput. 18(3):305-339, (2001).

Davis, Direct Methods for Sparse Linear Systems. SIAM, 2006 (100 pgs.).

Franzie et al, Effcient Solving of Large Non-linear Arithmetic Constraint Systems with Complex Boolean Structure, JSAT, Journal on Satisfiability, Boolean Modelling and Computation, vol. 1 (3-4): 2007, pp. 209-236.

Gundersen et al, Sparsity in higher order methods for unconstrained optimization, Optimization Methods and Software, 27(2):275-294 (2012).

Gustavson, Two Fast Algorithms for Sparse Matrices: Multiplication and Permuted Transposition, ACM Transactions on Mathematical Software, 4(3): 250-269, 1978.

Jonsson et al., Verifying Safety Properties of a Class of Infinite-State Distributed Algorithms, Lecture Notes in Computer Science, 1995, vol. 939, pp. 42-53.

Kolda at al, Scalable Tensor Decompositions for Multiaspect Data Mining, in ICDM 2008: Proceedings of the 8th IEEE International Conference on Data Mining, Dec. 2008, pp. 363-372.

Lathauwer et al, On the Best Rank-1 and Rank-$(R_1, R_2, \ldots, R_N)$ Approximation of Higher-Order Order Tensors, SIAM J. Matrix Anal. Appl., 21:1324-1342, Mar. 2000.

Lin at al, Efficient data compression methods for multidimensional sparse array operations based on the EKMR scheme, IEEE Trans. Comput., 52(12)1640-1646, (2003).

Lin et al, Efficient Representation Scheme for Multidimensional Array Operations, IEEE Transactions on Computers, 51:327-345, 2002.

Mahajan et al., Zchaff2004: An Efficient SAT Solver, LNCS, 2005, pp. 360-375.

Nieuwenhuis, Solving SAT and SAT Modulo Theories: From an Abstract Davis-Putnam-Logemann-Loveland Procedure to DPLL(T), Journal of the ACM (JACM) JACM vol. 53 Issue 6, Nov. 2006, pp. 937-977.

Vera at al, An Accurate Cost Model for Guiding Data Locality Transformations—Politecnica de Catalunya-Barcelona University—Sep. 2005.

Jonsson et al., "Verifying Safety Properties of a Class of Infinite-State Distributed Algorithms", Lecture Notes in Computer Science, 1995, vol. 939, pp. 42-53.

Mahajan et al., "Zchaff2004: An Efficient SAT Solver", LNCS, 2005, pp. 360-375.

International Preliminary Report on Patentability dated Jan. 6, 2009 for PCT Application No. PCT/US2007/72260.

International Preliminary Report on Patentability dated Nov. 1, 2011 for PCT Application No. PCT/U52010/033049.

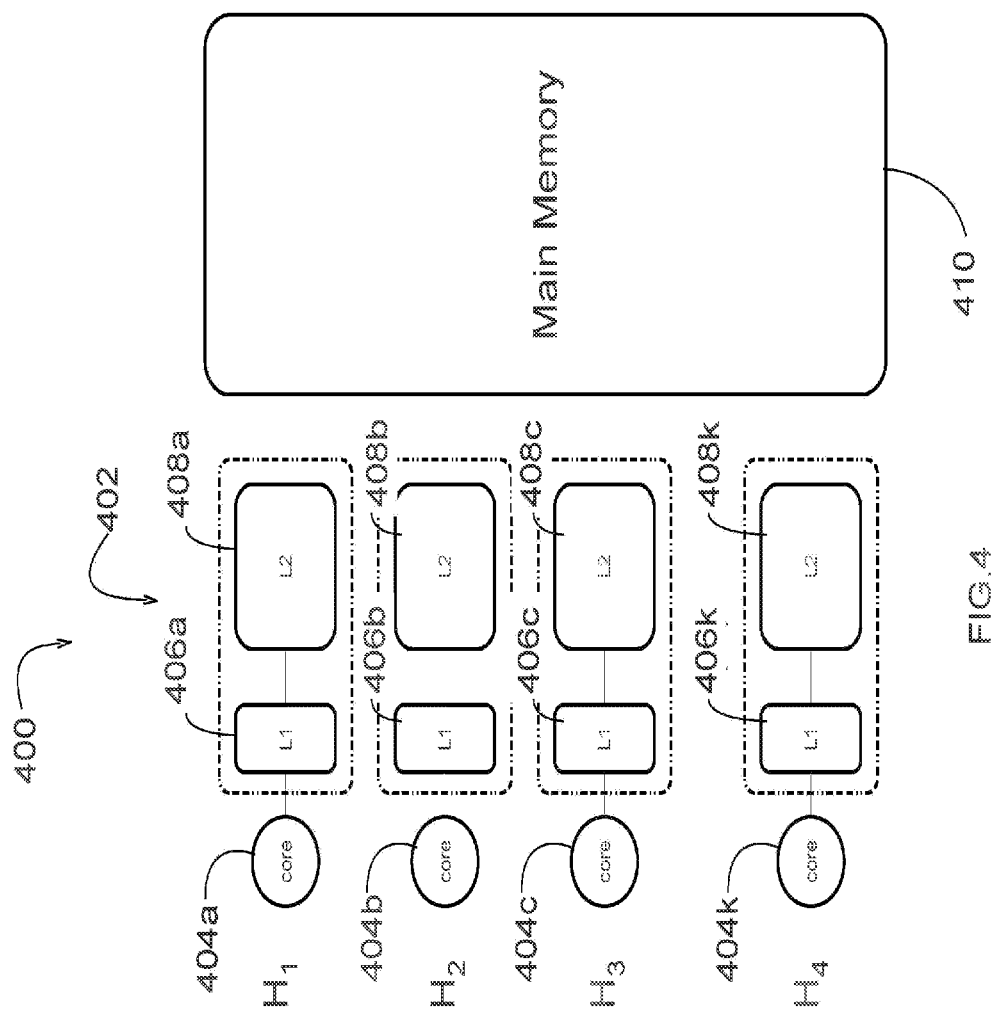

SYSTEMS AND METHODS FOR A FAST INTERCONNECT TABLE

CROSS REFERENCE TO RELATED APPLICATIONS

This application claims priority to and the benefit of U.S. provisional application Ser. No. 61/394,140, filed Oct. 18, 2010, disclosures of which is incorporated herein by reference in its entirety.

GOVERNMENT INTERESTS

This invention was made with Government support under contract no. FA8750-09-C-0229 awarded by the Air Force. The Government has certain rights in the invention.

FIELD OF THE INVENTION

The present invention generally relates to multi-core/processor systems, and in particular to systems in which two or more cores/processors concurrently process data.

BACKGROUND

In various computer applications, particularly those requiring processing of a large number of data elements (e.g., hundreds, thousands, or even millions of records), hash tables are typically used to store and/or access the data elements (collectively called data). In general, the hash tables provide faster, more efficient access to the data compared to storing/accessing the data using simple structures or arrays. The origins of hash tables date back to the 1960s, when authors of compilers used the concept of hashing as a mechanism for maintaining lists of user-defined names and associated properties. These initial developments lead to the formalization of several classic techniques used today to implement hash tables. These techniques include separate chaining, open addressing (linear, quadratic probing, double hashing), etc.

A hash table is usually implemented using a hash function, which receives a key, i.e., an attribute of the data element to be stored or accessed. The hash function generates an index (e.g., a number) into the hash table, the index corresponding to the key received. The data element is then stored in a "bucket" (e.g., a set of memory locations) identifiable by the index. The hash function may generate the same index for more than one key, each key corresponding to a different data element. As a result, more than one data element may be stored in one bucket. The time required to store a data element in a bucket, or to access the data element from a single bucket depends, in part, on the number of data elements in the bucket. In general, the more elements in the bucket, the more the storage and/or access time.

Typically, it is desirable to configure hash tables and hash functions such that the hash function generates, for several keys received, indices that are substantially uniformly distributed over the hash table. Therefore, each bucket may hold similar number of data elements. As a result, once a bucket corresponding to a data element is identified by the hash function, that data element can be stored in the identified bucket or accessed therefrom relatively efficiently compared to storing/accessing the data element from a bucket that contains significantly more elements than other buckets.

Various additional techniques such as bloom filters, d-left hashing, cache awareness, and lock-free algorithms have also been developed recently in order to improve the performance (e.g., access time, memory footprint, etc.) of the hash tables. Bloom filters, for example, can reduce the number of memory accesses of a hash table while locating a data element stored therein. Two-way chaining can reduce with high probability the size of the fullest bucket in a chaining-based hash table. By doing so, the maximum access time to the hash table is also reduced with high probability. The "always-go-left" algorithm may further improve the performance of two-way chaining technique by introducing asymmetry. The two-way chaining technique has been generalized as d-way chaining, and another hashing mechanism called d-left hashing was developed by combining d-way chaining and the always-go-left algorithm.

While the theoretic work on hash tables generally focuses on the algorithmic aspects of the problem (e.g., substantially even distribution of keys over the hash table), the specific details of the implementation of the hash table can play a crucial a role in determining the bottom-line performance of a computer system. One such important aspect of the implementation is the interaction between software and hardware resources and, specifically, the memory access patterns derived from stressing the hash table. To minimize expensive memory accesses, it is desirable that the system is designed or tuned to maximize cache hit ratios, which is an important system-performance parameter.

To this end, hash data structures that can fit in hardware cache lines have been proposed. For instance, in separate chaining (e.g., d-way chaining), hash tables can be tuned to have only a certain maximum number of collisions per entry (i.e., distinct keys that may be mapped by the hash function to the same bucket) that is less than or equal to the number of elements that fit into a cache line. If a bucket of the hash table to which a key is mapped is not located in the cache, one cache line may be accessed from the main memory, requiring one memory access. Because the bucket size is less than or equal to the size of the cache line, the entire bucket containing the required data element (or its designated memory location in the bucket) would now be available in the cache. As a result, hash-table operations such as put (i.e., store), get (i.e., access, read, etc.), and remove, may require only one memory access. The d-left hashing technique has been used to tune the maximum number of collisions per hash table entry in order to fit a bucket into a single cache line. The use of Bloom filters can avoid memory accesses for those get and remove operations invoked on elements that are not in the hash table.

Many modern computer systems include more than one processing units (e.g., processors, cores, etc.). In such systems, two processing units may simultaneously access a hash table or a location therein, and may seek to store or modify data at that location at the same time, which can cause data corruption. Two common hardware approaches to achieve concurrent access to a hash table while preventing data corruption include locking and using atomic operations such as compare and swap (CAS).

In locking, the entire hash table or small subcomponents thereof (e.g., buckets in a separate chaining-based table) are locked, i.e., when one processor is granted access to the hash table or a portion thereof, all other processors that may otherwise access the hash table are temporarily denied such access until the processor to which the access was granted completes its operation. Though locking may prevent data corruption, it can impose significant performance penalties on a system that includes several processors because each processor, before accessing a location in the hash table, must first determine whether that location is accessible at that time. The performance of systems employing locking can degrade even more as the number of processors or cores in the system increases because locking tends to scale poorly with large number of cores due to excessive amount of locking contention.

The CAS-based methods are sometimes also called "lock-free" methods, because they do not require locking a hash table or portions thereof. As one of ordinary skill in the art would appreciate, however, the CAS-based methods are, in fact, memory-based locking methods, requiring a lock to be maintained in the memory. Therefore, before accessing a location in the hash table, each processor/core in a multi-processor/core system must check the lock in the memory. As such, typical CAS-based methods still require some degree of memory contention, though that contention usually occurs at a table-entry level, rather than at a bucket or table level as is the case with lock-based methods. Though the check can be performed using a fast atomic operation such as CAS, the checking requirement can still impose performance penalties, and may limit scaling of the multi-core/processor system.

SUMMARY

In various provided embodiments, systems and methods for creating and/or operating a hash table called as a fast interconnect table (FIT) can facilitate concurrent access by a number of cores/processors of a multi-core/processor system to a FIT used by that system without requiring memory-based locking. This is achieved, in part, by partitioning the FIT on to the local memory units designated to each core such that a portion of the FIT to be processed by a certain core/processor is not located in the local memory unit of another core/processor. In addition, when a request to process a data element is received by a core not designated to process that data element, that data element is forwarded for processing to the appropriate core using a specialized network. Thus, both processing and synchronization of the data elements is achieved without requiring a memory-based lock.

Accordingly, in one aspect, a method is provided for allowing a processing element access to data. The method includes determining, at a first processing element (e.g., a core), if a datum is to be processed by the first processing element. This determination is based on a first function (e.g., a first hash function). If the datum is determined to be processed by the first processing element, the method includes selecting a table location based on the datum and a second function. The selected table location is designated to the first processing element. The method also includes accessing the datum at the selected table location. If the datum is determined not to be processed by the first processing element, the method includes communicating the datum to a second processing element, using a network configured to avoid contention for memory designated to the second processing element if the second processing element and any other processing element simultaneously access any data in the memory designated to the second processing element.

In some embodiments, the selected table location corresponds to memory designated to the first processing element. The memory designated to the first processing element may include a cache memory allocated to the first processing element and/or a main memory. Accessing the datum may include reading the datum, storing the datum, or both.

The second function may cause the selected table location to belong to a first bucket of memory locations within the memory designated to the first processing element. The second function may also cause a size of the first bucket to be less than or equal to a cache-line size of the memory. In some embodiments, the second processing element is designated to process the datum. Communicating the datum may include inserting the datum in a queue of data elements at the second processing element. Each element in the queue may access the memory designated to the second processing element in a sequence, so that contention for the memory may be avoided.

In some embodiments, the selected table location belongs to a first bucket of memory locations within a memory designated to the first processing element, and the method includes growing the first bucket of memory locations. The growing may include linking to the first bucket of memory locations a memory buffer having a size equal to the size of the first bucket. The growing may also include forming a second bucket of memory locations associated with the first bucket, and selecting a function to distribute data stored in the first bucket between the first and second buckets. In some embodiments the first and the second processing elements are located on a single chip.

In another aspect, a computing apparatus for accessing data includes a processor (e.g., a core in a multi-core system) and a memory coupled to the processor. The processor is configured to determine, based on a first function, if a datum is to be processed by the processor. If the datum is determined to be processed by the processor, the processor is configured to select a table location based on the datum and a second function, the selected table location being designated to the processor, and to access the datum at the selected table location. If the datum is determined not to be processed by the processor, the processor is configured to communicate the datum to another processor, using a network. The network is configured to avoid contention for memory designated to the second processor if the second processor and any other processor simultaneously access any data in the memory designated to the second processor.

The selected table location may correspond to the memory coupled to the processor. The memory coupled to the processor may include a cache memory allocated to the processor (e.g., L1 cache or L1 and L2 cache), and a main memory. The access includes reading the datum, storing the datum, or both. The processor and the other processor are located on a single chip.

In some embodiments the second function causes the selected table location to belong to a first bucket of memory locations within the memory coupled to the processor. The second function may also cause a size of the first bucket to be less than or equal to a cache-line size of the memory.

In some embodiments, the computing apparatus includes a network interface in communication with the network and the processor. The network interface is configured to create a queue of data elements, to receive a data element via the network, and to insert the received data element in the queue. This may cause each data element in the queue to accesses the memory coupled to the processor in a sequence, thereby avoiding contention for the memory.

In some embodiments, the selected table location belongs to a first bucket of memory locations within the memory coupled to the processor, and the processor is further configured to grow the first bucket of memory locations. The processor may be further configured to link to the first bucket of memory locations a memory buffer having a size equal to the size of the first bucket, thereby growing the first bucket. The processor may also be configured to form a second bucket of memory locations associated with the first bucket, and to select and execute a function to distribute data stored in the first bucket between the first and second buckets, thereby growing the first bucket.

In another aspect, an article of manufacture, including a non-transitory machine-readable medium storing instructions that, when executed by a first processing element, configure the first processing element to determine, based on a first function, if a datum is to be processed by the first processing element. If the datum is determined to be processed by the first processing element, the instructions configure the first processing element to select a table location based on the datum and a second function, the selected table location being designated to the first processing element, and to access the datum at the selected table location. If the datum is determined not to be processed by the first processing element, the instructions configure the first processing element to communicate the datum to a second processing element, using a network configured to avoid contention for memory designated to the second processing element if the second processing element and any other processing element simultaneously access any data in the memory designated to the second processing element.

The selected table location may correspond to memory designated to the first processing element. The memory designated to the first processing element may include a cache memory allocated to the first processing element, and a main memory. The second processing element may be designated to process the datum. Access to the datum may include reading the datum or storing the datum. The first and the second processing elements may be located on a single chip.

In some embodiments, the second function causes the selected table location to belong to a first bucket of memory locations within the memory designated to the first processing element. The second function may also cause a size of the first bucket to be less than or equal to a cache-line size of the memory.

In some embodiments, the instructions configure the second processing element to insert the datum in a queue of data elements at the second processing element. As such, each element in the queue may access the memory designated to the second processing element in a sequence, thereby avoiding contention for the memory.

The selected table location may belong to a first bucket of memory locations within a memory designated to the first processing element. The instruction may further configure the first processing element to grow the first bucket of memory locations. In some embodiments, the instruction further configure the first processing element to link to the first bucket of memory locations a memory buffer having a size equal to the size of the first bucket, thereby growing the first bucket. The instruction may also configure the first processing element to form a second bucket of memory locations associated with the first bucket, and to select a function to distribute data stored in the first bucket between the first and second buckets, thereby growing the first bucket.

BRIEF DESCRIPTION OF THE DRAWINGS

Various embodiments of the present invention taught herein are illustrated by way of example, and not by way of limitation, in the figures of the accompanying drawings, in which:

FIG. 4 illustrates a multi-core computer system including a memory system thereof, consistent with provided embodiments.

Figure 1:
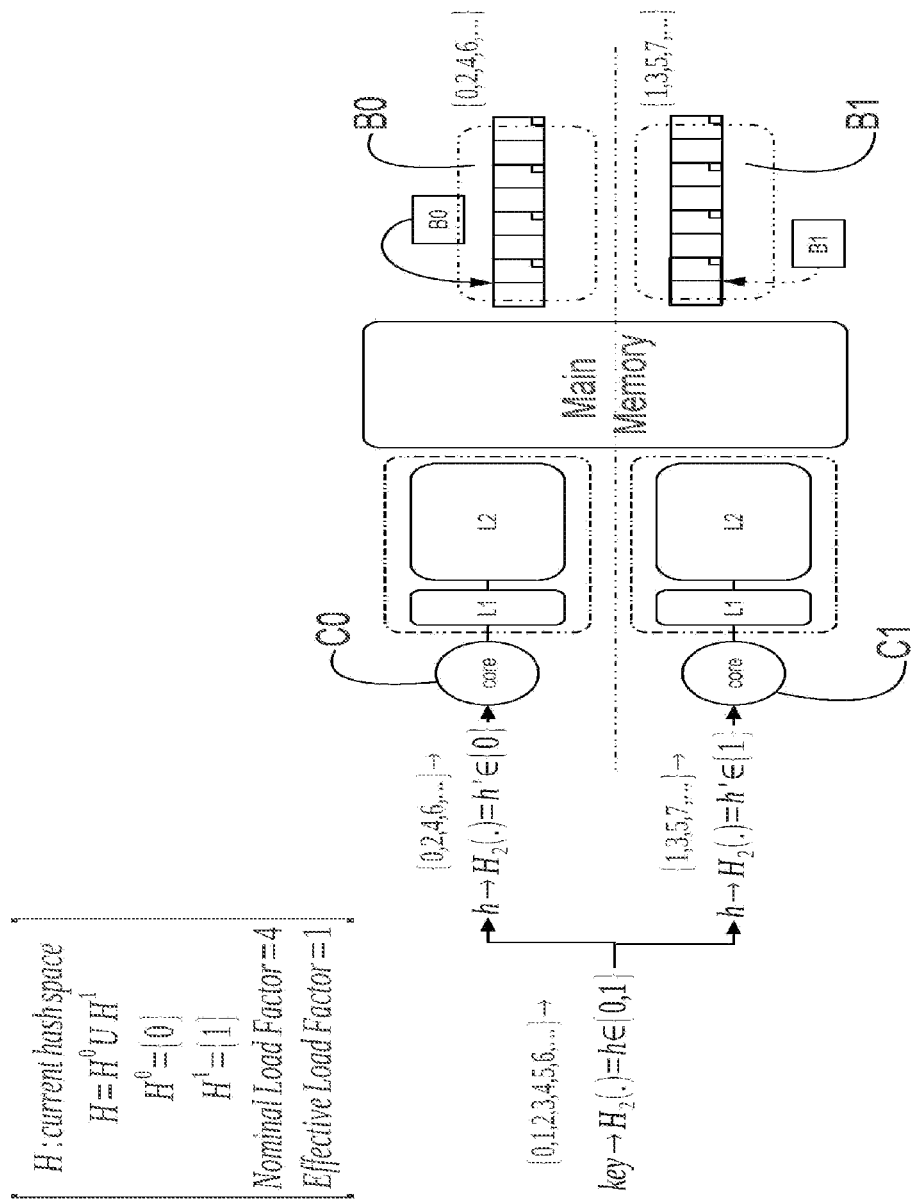
FIG. 1 illustrates a multi-core computer system employing a FIT, consistent with provided embodiments.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. Descriptions of well known components, methods and/or processing techniques are omitted so as to not unnecessarily obscure the invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The following notation will be used to describe the lock-free multi-core (LFM) algorithm:

| Term | Definition |
| --- | --- |
| N | The number of cores available to process hash table operations |
| $H_M$ | A hash function that returns an integer value between 0 and M |
| L | The number of entries that can fit into a cache line |
| T | A hash table |
| B | Number of buckets in the hash table |
| T[b] | (b + 1)-th bucket in hash table T |
| forwardCore(c, m) | A function that forwards a message m to core c |
| thisCoreId( ) | A function that returns the identifier of the core on which it is invoked |

The nominal load factor (NLF) is defined as the number of stored keys divided by the number of buckets, i.e., $$NLF = \frac{\text{number of stored keys}}{\text{number of buckets}}$$

The effective load factor (ELF) is defined as the number of stored keys divided by the number of buckets times the number of entries per bucket, i.e., $$NLF = \frac{\text{number of stored keys}}{\text{number of buckets} \times \text{number of entries per bucket}}$$

The nominal load factor can provide an estimate of the number of collisions produced in a hash table operation. On the other hand, for the case in which buckets are tuned to be of size equal to L (i.e., the size of a cache line), the effective load factor can provide an estimate of the number of memory accesses required by a hash table operation. This is because the underlying hardware executes memory reads by loading into the cache memory segments of size equal to the cache line size (i.e., L). Therefore, when the size of the bucket is less than or equal to L, only one memory access may be required to load a complete bucket, that contains the required data element, into the cache.

The value of NLF does not depend on the underlying hardware (i.e., it is hardware agnostic), but the ELF provides hardware-awareness because the value of ELF depends on L, i.e., the size of the cache line. Various embodiments of the LFM-based systems and methods described herein, rather than merely minimizing the value of the nominal load factor, adjust or optimize the value of ELF, thereby using information about the underlying hardware to improve the performance thereof.

The LFM algorithm initiates by allocating a hash table with p×N buckets, for some integer p, that, for example can be the number of buckets per core. Upon receiving a key k (i.e., a value of a data element to be processed) at an arbitrary core C of a multi-core system, the operations to process that key k are described in the following algorithm:

h←$H_N$(k);
if h==thisCoreId( )
  h'←H'(k);
  processKey(T[h'], k);
else
  forwardCore(h, k);
endif The algorithm uses a first hash function $H_N$(k) to decide which core of the multi-core system must process the key k. If $H_N$(k) returns a coreid h that is different than the identifier of the core C at which this processing is being performed, the key k is forwarded to the core h designated to process the key k. Otherwise, the core C calculates a new hash value h' using another hash function H'(k) and uses a bucket T[h] to process the key k.

Thus, the LFM algorithm employs two hash functions. First, it uses $H_N$(k) to determine which core will process a processing request with respect the key k. Then, the LFM algorithm uses the second hash function H'(k) to retrieve a bucket in the hash table assigned to the key k. Various hash functions can be selected as the first and second hash functions, thereby inducing a family of LFM algorithms that can provide a degree of flexibility in designing hash tables that are cache aware.

In general, a multi-core/processor system includes several cache memory units and a main memory. Each processor/core is typically designated a cache memory unit, while the main memory is common to some or all processors/cores. Generally, a cache memory unit designated to a processor/core can be directly accessed by that processor/core, but a cache memory unit designated to another processor/core may only be accessed via the other processor/core. As such, a direct access to a processor's own cache tends to be substantially faster than an indirect access to another processor's or core's cache via that processor/core. A cache memory unit may include various levels of cache, usually designated as L1 cache, L2 cache, etc.

One family of hash functions, denoted as {$H_N$, H'} provides L1 cache awareness. The hash functions family {$H_N$, H'} is L1-cache aware if the following property is satisfied by the hash functions:
(1) Let k and k' be two different keys, then:
  If $H_N$(k)≠$H_N$(k') implies H'(k)≠H'(k')
(2) U {H'(k), for all possible key k}={1, . . . , B}, where B is the current number of buckets in the table The first condition ensures that every bucket can only be accessed by one processor/core. In a multi-processor/core system, this property can configure the cores such that a core will not try to fetch buckets that are cached (i.e., located) in some other core's cache. Accordingly, this condition may eliminate or mitigate cache misses produced in typical multi-processor/core environments where different cores compete against each other for the cache memory resources. Due to this property, a portion of the hash table Tc that is designated to be accessed by a core C is located in the L1 cache of the core C, and the other portions of the hast table, i.e. (T-Tc), are not located in the L1 cache of the core C.

As described above, the core C can directly, and hence, rapidly access the data elements in its own L1 cache. Therefore, according to this configuration, each processor/core in the multi-core/processor system can access the data elements in the portion of the hash table to be processed by that core/processor. This can make each core "very good" (i.e., efficient) at processing the portion of the hash table designated to that core.

In this configuration, although a processor/core m cannot efficiently access a portion of the hash table (T-Tm), because that portion is not located in the L1 cache of the processor/core m, the core m does not specialize (i.e., it is not designated) the data elements that belong to the (T-Tm) portion of the hash table, and hence, the core m would not be required to access the (T-Tm) portion of the hash table. Because the hash functions are responsible to assign a key k to that core that has specialized in the portion of the table storing the key k, by choosing a family of hash function {$H_N$, H'} satisfying the L1-cache awareness conditions (i.e., the conditions 1 and 2, described above), separation of concerns can be provided. According to the separation of concerns, a core/processor may be required to access data only from its own cache, or from the main memory, and not from the cache of another core/processor.

The above-described property that provides of L1-cache aware family of hash functions also results in the following two lemmas.
  Lemma 1. The set of buckets Bc assigned to core c is given by:
    Bc={b such that $H_N$(b)=c}
  Lemma 2. The pair of hash functions {$H_N$, H'=$H_B$} satisfy the L1-cache awareness property for B=p×N, where p is an integer, e.g., representing the number of buckets per core/processor.

With reference to FIG. 1, in an embodiment of a FIT based on the LFM algorithm in which N=2 and L=4, the initial set of hash functions is chosen as {$H_2$, $H_2$}, where $H_2$(k)=k mod 2. According to Lemma 2, such hash functions satisfy the L1-cache awareness property. For example, consider a set of keys equal to the set of natural numbers {0, 1, 2, 3, . . . }. For key k=4, $H_2$(4)=0, therefore the key 4 is forwarded to core C0. Then, core C0 will use a bucket identified by $H_2$(4)=0, i.e., bucket B0, to process the key 4. For another key k=5, because $H_2$(5)=1, the key 5 will be designated to core C1, which will use bucket B1 to process the key 5. In general, keys {0, 2, 4, 6} will be stored in the bucket B0, while keys {1, 3, 5, 7} will reside in the bucket B1. For this initial set up, the hash table has NLF=4 and ELF=1.

If the number of elements in a bucket is allowed to grow beyond L, a grow algorithm is required to increase the size of the hash table. For example, suppose that the bucket B1 becomes full with 4 entries {1, 3, 5, 7}. Upon arrival of the next key k=9, in order to store that key (or the data element associated with the key 9), the hash table must be grown. The table may be grown in two ways: (1) bucket enlargement, or (2) bucket spawning.

Figure 2:
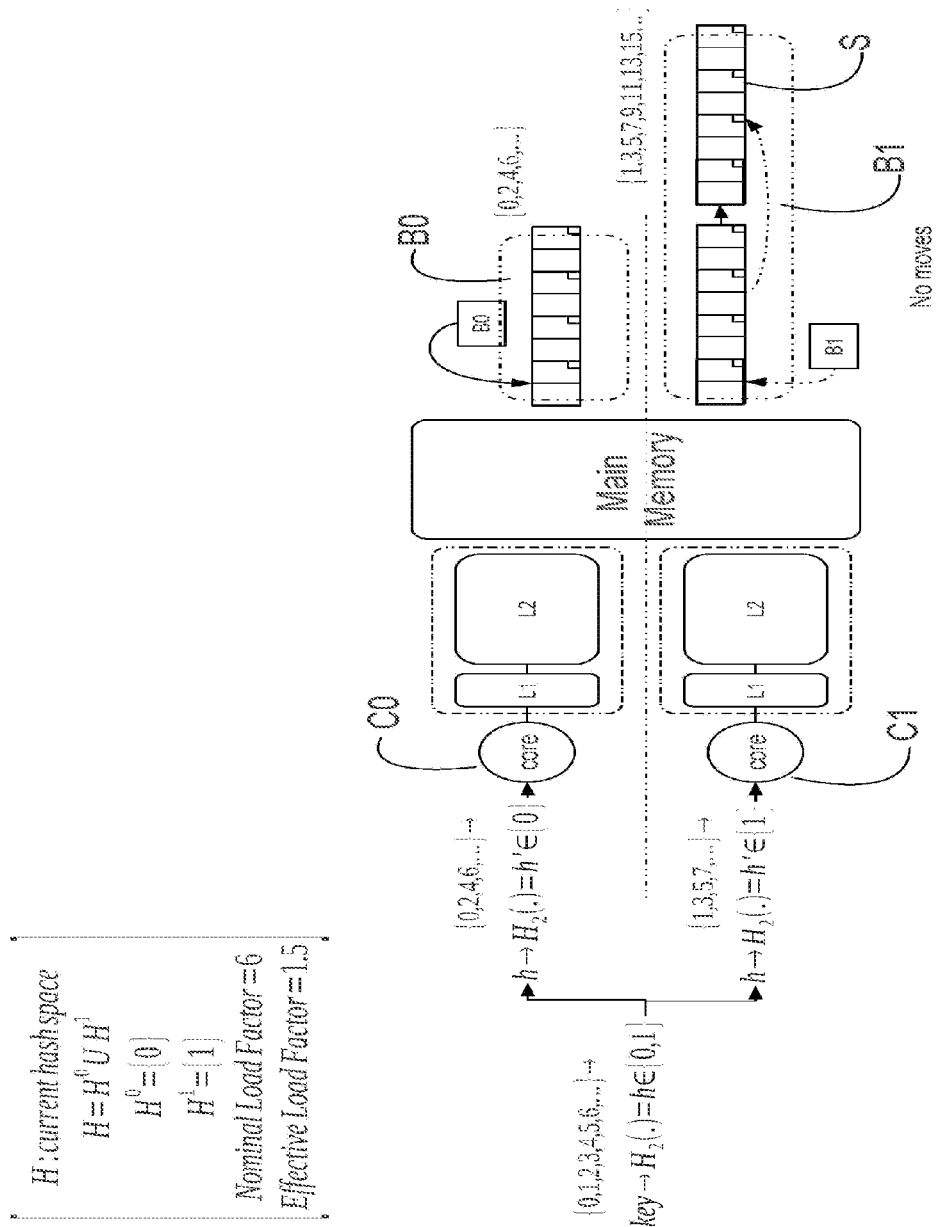
FIGS. 2 and 3 illustrate a multi-core computer system employing FITs that are grown, consistent with provided embodiments.

With reference to FIG. 2, bucket enlargement allocates a new buffer of memory to store L more elements, and links the buffer to the bucket it intends to enlarge. According to the example above, the bucket B1 is increased with an additional memory segment S, making the size of the bucket B1 equal to 8 elements. Under this approach both the nominal and effective load factors can increase. For example, growing the bucket B1 causes NLF=6 and ELF=1.5, both becoming 50% larger than their respective original values.

Figure 3:
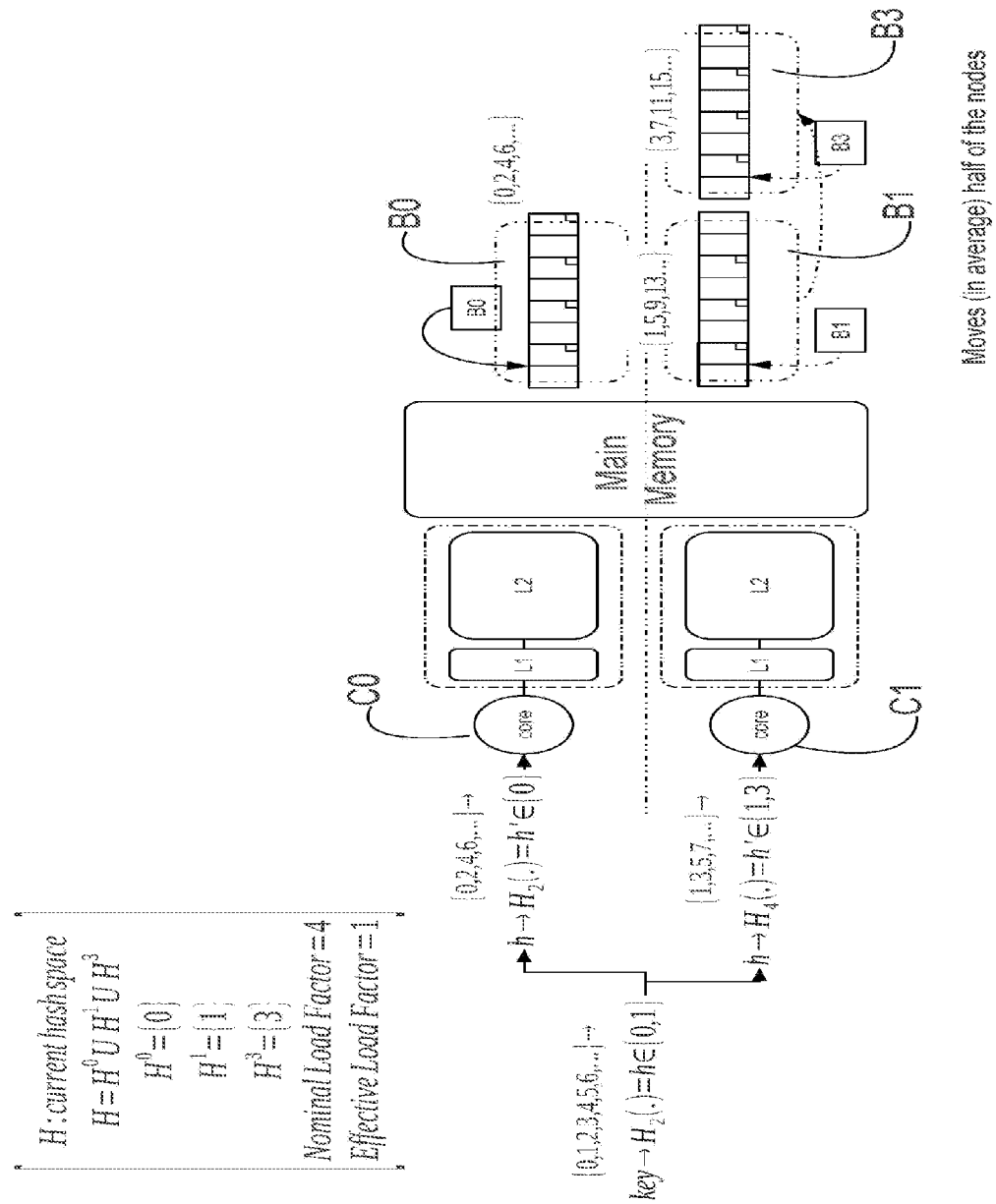

The bucket spawning algorithm creates a new bucket instead of enlarging an existing one, and can thus provide a mechanism to grow the hash table without causing the NLF and ELF to increase. With reference to FIG. 3, upon arrival of key k=9, the following actions take place:

Bucket allocation: a new bucket of size L elements is allocated; its bucket identifier is set to 3, i.e., the new bucket is denoted as B3.

Update hash function: the hash function in core C1 is changed from $H_2$ to $H_4$, where $H_4(k)$=k mod 4.

Move elements: the elements in bucket B1 are removed and reinserted using the new hash function $H_4$.

Insert new key: the new key k=9 is now inserted using the new hash function $H_4$.

In the example above, the new key k=9 is inserted in bucket B1, but in some instances, the new key may be inserted in the new bucket. In this example, the NLF remains equal to 4 and the ELF remains equal to 1. Furthermore, because all operations in spawning a bucket (i.e., allocation, rehashing, moving, inserting) can be made by one single process, there is no need for providing a memory lock. As such, bucket spawning facilitates the memory lock-free mechanism for growing a hash table that may be concurrently accessed by a number of processors/cores.

One overhead incurred by bucket spawning is that some elements may need to be moved from the existing buckets to the newly created buckets. For instance, in the example above, the element corresponding to key k=3 must be moved from the bucket B1 to the bucket B3 because the hash function was changed from $H_2$ to $H_4$. Such operation is necessary so as to keep the load factors unchanged. However under certain conditions, for example, if the number of buckets is a power of 2, on an average only half of the elements in the previously allocated buckets need to be moved to the new buckets due to the split-order property of those buckets.

Various embodiments of high performance hash tables that are tuned according to the specific nature of the application and the underlying set of hardware resources, as described above, can be further improved. Consider, for example, a Bloom filter that may take into account the nature of the application. Let h be the probability that a get(k) request for a key k on a hash table T returns a value equal to NULL. Then, there exists a value $h_t$ such that if h>$h_t$, then the average time to resolve a get(k) request (a request that provides access to a data element corresponding to the key k) can be reduced by implementing a Bloom filter to first check membership of k in T. If the Bloom filter returns FALSE, then immediately return NULL to the caller (i.e., a module requesting the data element corresponding to the key k) without looking up the hash table. Otherwise, look up the hash table for key k.

In this example, the Bloom filter acts as a fast path implementation. If the fast path returns FALSE, then there is no need to execute the slow path (i.e., the actual look up operation on the hash table T of the key k). The probability that the fast path returns FALSE is close but not larger than h. This probability may not be exactly equal to h because Bloom filters may generate false positives.

Alternatively, or in addition, consider the d-left algorithm that can account for the nature of the hardware, and thus, provides a mechanism to control the load factors NLF and ELF. By increasing the d value, i.e., the number of hash functions used in a d-left hashing, the maximum number of elements in a bucket can be decreased. In general, when there are as many elements as buckets, the size of the bucket depends on d as follows:

$$\frac{\log(\log(n))}{\log(d)} + O \qquad (1)$$

where n is the number of elements in the table. As the number of hash functions d increases, the bucket size decreases, and hence, d can be used as a tuning parameter for the design of buckets that may fit into cache lines. Therefore, for a given cache line size L that is determined by the underlying hardware architecture, the d parameter can be selected to yield buckets of size less than or equal to L.

To provide a flexible implementation that can accommodate for a variety of application and hardware environments, various building blocks that can be coupled with embodiments of the LFM algorithm, depending on the requirements of the problem, are provided. These building blocks include linked list-based buckets, vector based buckets, separate chaining hashing scheme, open addressing hashing scheme, hash tables, sets, Bloom filters to optimize membership checking in the hash table, d-left hashing to tune optimize the number of collisions, LFM algorithm, and CoreNetworks.

With reference to FIG. 4, Tilera, a multi-core system 400 includes an on-chip caching subsystem 402. Although only a data cache subsystem 402 is described herein, various embodiments may include the instruction cache subsystem, either individually or in combination with the data cache subsystem 402. A core 404a is coupled with its own L1 cache 406a and L2 cache 408a. An L1 cache 406a may be exclusively used by the core 404a that owns it, while the L2 cache 408a can be remotely accessed from foreign cores, e.g., the cores 404b, 404c, 404k, at a performance penalty. If data required by the core 404a cannot be located in either of its caches 406a, 408a, then the data is fetched from an off-chip main memory 410.

The following Table summarizes the access times to each of the storage subcomponents of Tilera. Of special interest is the latency incurred to perform an L2 remote access operation, which at 30 to 60 cycles, is 3 to 7 times slower than a local access to L2 cache. Various embodiments of the concurrently accessible FIT can avoid the need to perform such types of accesses, because, as described above, each core 404a, 404b, 404c, 404k is configured to specialize on non-overlapping segments of the hash table. For any core, the corresponding segment is not located on the cache of another core.

| Operation | Latency |
|---|---|
| L1 cache access (always local) | 2 cycles |
| L2 local cache access | 8 cycles |
| L2 remote access | 30-60 cycles |
| Memory access | 80 cycles |

Figure 5A:
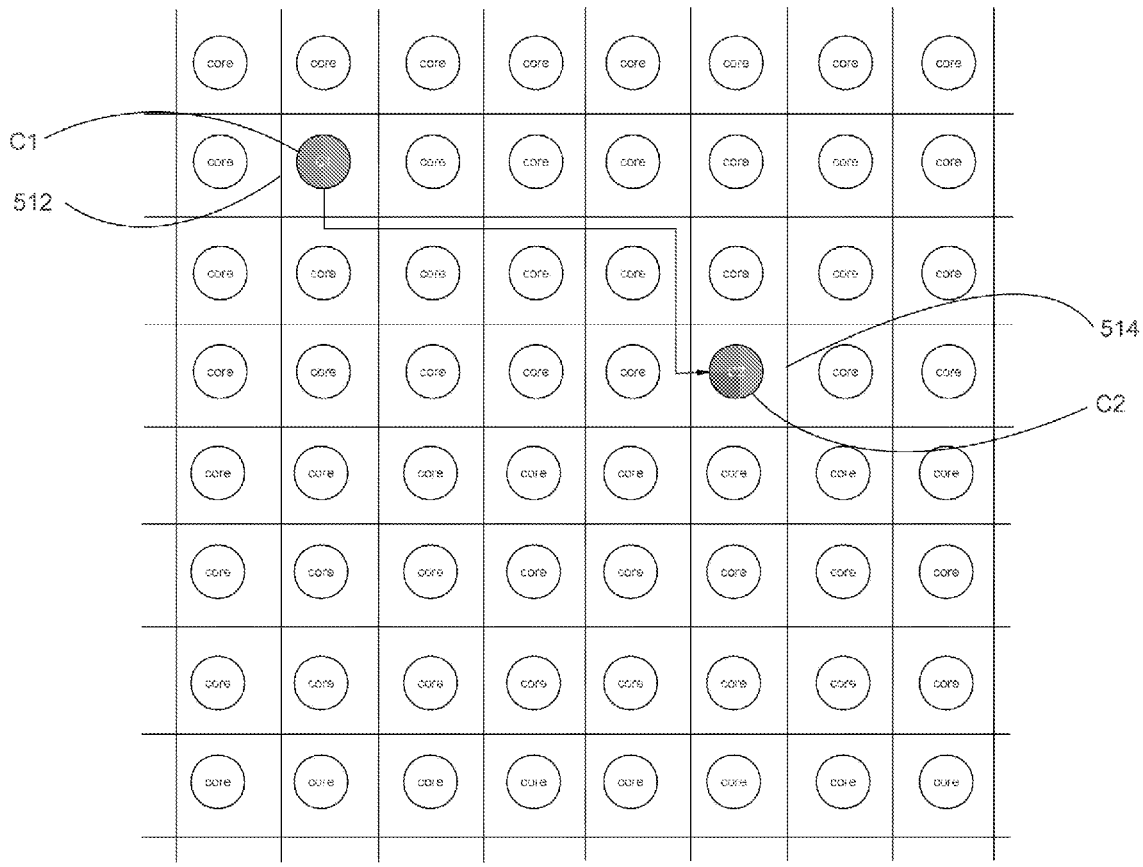
FIGS. 5A and 5B illustrate a network on a multi-core computer system, consistent with provided embodiments.
Figure 5B:
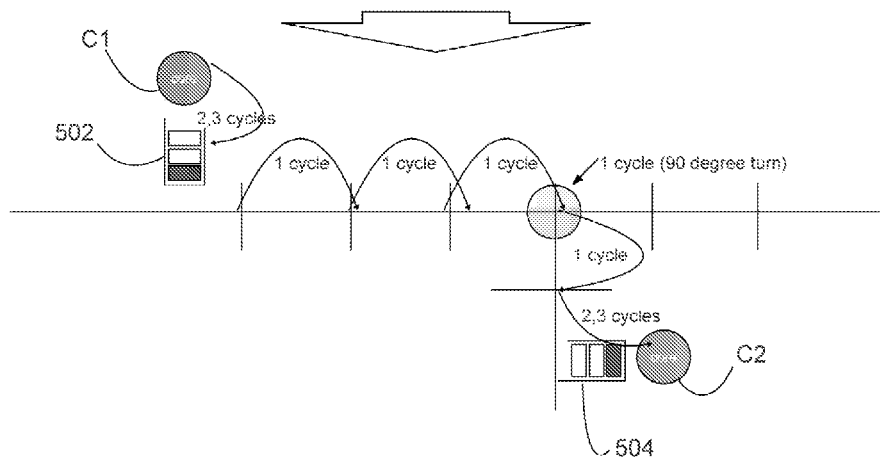

With reference to FIGS. 5A and 5B an on-chip core interconnect subsystem of a multi-core system (e.g., Tilera)

includes a user dynamic network (UDN). The UDN provides a high performance on-chip mechanism to pass data between cores. In various embodiments, the UDN is used to implement the forwardCore( ) function of the LFM algorithm.

A transaction to send data from core C1 to core C2 follows the following procedure: Core C1 writes a data word to an egress UDN FIFO 502 on core C1 which is propagated down to the UDN switch of core C1. This operation may take about 2-3 cycles. Then the data word is propagated over the UDN to the ingress UDN FIFO 504 of the core C2. That may take one cycle per hop, i.e., the Manhattan distance between tile1 512 and tile2 514, given by (|x1−x2|+|y1−y2|), where (x1, y1) are the row and column indices, respectively, of the tile1 512, and (x2, y2) are the row and column indices, respectively, of the tile2 514. An extra cycle may be required if the data needs to make a 90 degree turn, i.e., if the core C2 has neither a row index not a column index that is the same as that of the core C1. Next, the word propagates up from the UDN switch on to core C2. This operation may also take 2-3 cycles.

For example, if 16 cores are needed to implement a multi-core system, the maximum number of cycles required to transmit a word between two cores is: 3 (to get on the UDN switch)+3 (to traverse the UDN switch horizontally)+1 (to make a 90 degree turn)+3 (to traverse the UDN switch vertically)+3 (to get off the UDN switch)=13 cycles. In general, the time to forward data between two cores depends on their relative distance. Therefore, it may be important that cores participating in a single algorithm be strategically located so as to minimize the distance therebetween. Although an exemplary interconnect is described above using the Tilera multi-core system, it should be understood that various embodiments of a FIT can be based on other interconnect systems provided by the multi-core/processor systems for which that FIT embodiment is being tuned.

Various embodiments of FIT can provide the following benefits in comparison to the known approaches such as lock-based and atomic operation-based techniques. In the case of lock-based systems, the mechanism allowing concurrent access to the hash table without data corruption is a hardware lock, which is a memory-based lock. In the case of atomic operation-based algorithms, the mechanism is an atomic operation such as CAS, which also requires a memory-based lock. Various embodiments of FIT, however, make use of an on-chip hardware switch facility (e.g., UDN) to solve the concurrency problem, and thus, do not require a memory-based lock.

Division of labor: In embodiments of FIT, a bucket designated to a core is not processed by another core. As such a core in these embodiments need not access a remote cache of another core, as may be required in the lock and atomic-operation-based systems. Usually remote accesses to caches of other cores are slow compared to access to a core's own cache (e.g., in Tilera, 3 to 7 times slower than access to the local L2 cache). Therefore, various embodiments of FIT can be up to 3 to 7 times faster than other systems.

Cache hit ratio: In lock-based and CAS-based (i.e., atomic-operation-based) techniques, each core can potentially access any bucket of the hash table. Therefore, buckets will seek L2 and L1 local cache resources aggressively on each cache, causing several cache misses. As described above, a core in various embodiments of FIT need not access a remote cache of another core, and as a result these embodiments can yield a higher cache hit ratio compared to the other systems.

Zero memory-based lock: As described above, various embodiments of FIT do not use memory-based locks, and hence, unlike lock-based and atomic-operation-based systems, these embodiments do not cause a locking memory contention. Locking contentions can be a critical overhead in scaling up the number of cores. In various embodiments of FIT, memory-locking contentions are avoided, yet data corruption is also avoided by using an on-chip network, thus facilitating convenient scaling that may include a large number of processors/cores.

Memory access and inter-core data coherency: Consider the following situation in a traditional concurrent hash table. A core needs to modify a bucket that is currently hosted at a remote L2 cache. Such core needs first to load the remote bucket into its local cache and then modify it. Further, to ensure proper data coherency, the stale version of the bucket in the remote cache has to be updated. In various embodiments of FIT, there is no need to provide data coherency between L2 caches because these embodiments ensure that a bucket required by a core will either be in its local cache or, otherwise, in the main memory, but never in a remote cache. In some embodiments of FIT, if local cache operates at a high cache hit ratio, the need for data coherency between the local cache and main memory can be virtually avoided, substantially reducing the amount of memory accesses, thereby improving performance of the multi-core/processor system.

Smaller hash-table elements: In CAS-based (i.e., atomic-operation-based) algorithms, each element of the has table is required to have a CAS field, increasing the size of the element. In various embodiments of FIT, there is no need to keep any CAS field in the data element because synchronization is resolved via an on-chip network. Keeping the size of the element small can be important in order to maximize the number of elements that can fit into one bucket and therefore reduce the number of memory accesses required.

Memory access of atomic operations: Atomic operations such as CAS require at least one memory access, that are not required by various embodiments of FIT.

Separation of concerns: Various embodiments of FIT allow for a natural partition between workers (i.e., operations managing the hash table) and callers (i.e., the applications using the hash table). This can impact the performance of both the data and the instruction local caches. For instance, in various embodiments of FIT, the cores can be configured to exclusively run the LFM algorithm. For example, in Tilera, this is known as dataplane mode, or zero overhead on Linux. Because the LFM algorithm uses a relatively small number of instructions, the instructions of the algorithm may always found in the instruction cache, reducing the number of memory accesses.

Thus, it is seen that methods and systems for creating and/or operating fast interconnect tables that can improve system performance are provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

We claim:

1. A method of allowing a processing element access to data, the method comprising:
   determining, at a first processing element, based on a first function, if a datum is to be processed by the first processing element;
   if the datum is determined to be processed by the first processing element: (i) selecting a table location based on the datum and a second function, the selected table location being designated to the first processing element, and (ii) accessing the datum at the selected table location; and
   if the datum is determined not to be processed by the first processing element, communicating the datum to a second processing element, using a network configured to avoid contention for memory designated to the second processing element if the second processing element and any other processing element simultaneously access any data in the memory designated to the second processing element.

2. The method of claim 1, wherein the selected table location corresponds to memory designated to the first processing element.

3. The method of claim 2, wherein the memory designated to the first processing element comprises:
   a cache memory allocated to the first processing element; and
   a main memory.

4. The method of claim 2, wherein the second function causes: (i) the selected table location to belong to a first bucket of memory locations within the memory designated to the first processing element, and (ii) a size of the first bucket to be less than or equal to a cache-line size of the memory.

5. The method of claim 1, wherein the second processing element is designated to process the datum.

6. The method of claim 1, wherein the accessing comprises at least one of reading the datum or storing the datum.

7. The method of claim 1, wherein the communicating the datum comprises inserting the datum in a queue of data elements at the second processing element, each element in the queue accessing the memory designated to the second processing element in a sequence, thereby avoiding contention for the memory.

8. The method of claim 1, wherein the selected table location belongs to a first bucket of memory locations within a memory designated to the first processing element, the method further comprising growing the first bucket of memory locations.

9. The method of claim 8, wherein growing comprises linking to the first bucket of memory locations a memory buffer having a size equal to the size of the first bucket.

10. The method of claim 8, wherein growing comprises:
    forming a second bucket of memory locations associated with the first bucket; and
    selecting a function to distribute data stored in the first bucket between the first and second buckets.

11. The method of claim 1, wherein the first and the second processing elements are located on a single chip.

12. A computing apparatus for accessing data, the computing apparatus comprising:
    a processor; and
    a memory coupled to the processor, wherein the processor is configured:
    to determine, based on a first function, if a datum is to be processed by the processor;
    if the datum is determined to be processed by the processor: to (i) select a table location based on the datum and a second function, the selected table location being designated to the processor, and (ii) access the datum at the selected table location; and
    if the datum is determined not to be processed by the processor, to communicate the datum to another processor, using a network configured to avoid contention for memory designated to the second processor if the second processor and any other processor simultaneously access any data in the memory designated to the second processor.

13. The computing apparatus of claim 12, wherein the selected table location corresponds to the memory coupled to the processor.

14. The computing apparatus of claim 12, wherein the memory coupled to the processor comprises:
    a cache memory allocated to the processor; and
    a main memory.

15. The computing apparatus of claim 12, wherein the second function causes: (i) the selected table location to belong to a first bucket of memory locations within the memory coupled to the processor, and (ii) a size of the first bucket to be less than or equal to a cache-line size of the memory.

16. The computing apparatus of claim 12, wherein the access comprises at least one of reading the datum or storing the datum.

17. The computing apparatus of claim 12, further comprising a network interface in communication with the network and the processor, wherein the network interface is configured to:
    create a queue of data elements;
    receive a data element via the network; and
    insert the received data element in the queue, such that each data element in the queue accesses the memory coupled to the processor in a sequence, thereby avoiding contention for the memory.

18. The computing apparatus of claim 12, wherein the selected table location belongs to a first bucket of memory locations within the memory coupled to the processor, and the processor is further configured to grow the first bucket of memory locations.

19. The computing apparatus of claim 18, wherein the processor is further configured to link to the first bucket of memory locations a memory buffer having a size equal to the size of the first bucket, thereby growing the first bucket.

20. The computing apparatus of claim 18, wherein the processor is further configured to:
    form a second bucket of memory locations associated with the first bucket; and
    select and execute a function to distribute data stored in the first bucket between the first and second buckets, thereby growing the first bucket.

21. The computing apparatus of claim 12, wherein the processor and the other processor are located on a single chip.

22. An article of manufacture, comprising a non-transitory machine-readable medium storing instructions that, when executed by a first processing element, configure the first processing element to:
    determine, based on a first function, if a datum is to be processed by the first processing element;
    if the datum is determined to be processed by the first processing element: (i) to select a table location based on the datum and a second function, the selected table location being designated to the first processing element, and (ii) to access the datum at the selected table location; and if the datum is determined not to be processed by the first processing element, to communicate the datum to a second processing element, using a network configured to avoid contention for memory designated to the second processing element if the second processing element and any other processing element simultaneously access any data in the memory designated to the second processing element.

23. The article of claim 22, wherein the selected table location corresponds to memory designated to the first processing element.

24. The article of claim 23, wherein the memory designated to the first processing element comprises:
   a cache memory allocated to the first processing element; and
   a main memory.

25. The article of claim 23, wherein the second function causes: (i) the selected table location to belong to a first bucket of memory locations within the memory designated to the first processing element, and (ii) a size of the first bucket to be less than or equal to a cache-line size of the memory.

26. The article of claim 22, wherein the second processing element is designated to process the datum.

27. The article of claim 22, wherein the access comprises at least one of reading the datum or storing the datum.

28. The article of claim 22, wherein the instructions configure the second processing element to insert the datum in a queue of data elements at the second processing element, each element in the queue accessing the memory designated to the second processing element in a sequence, thereby avoiding contention for the memory.

29. The article of claim 22, wherein the selected table location belongs to a first bucket of memory locations within a memory designated to the first processing element, and the instruction further configure the first processing element to grow the first bucket of memory locations.

30. The article of claim 29, wherein the instruction further configure the first processing element to link to the first bucket of memory locations a memory buffer having a size equal to the size of the first bucket, thereby growing the first bucket.

31. The article of claim 29, wherein the instruction further configure the first processing element to:
   form a second bucket of memory locations associated with the first bucket; and
   select a function to distribute data stored in the first bucket between the first and second buckets, thereby growing the first bucket.

32. The article of claim 22, wherein the first and the second processing elements are located on a single chip.

\* \* \* \* \*